Figure 1:
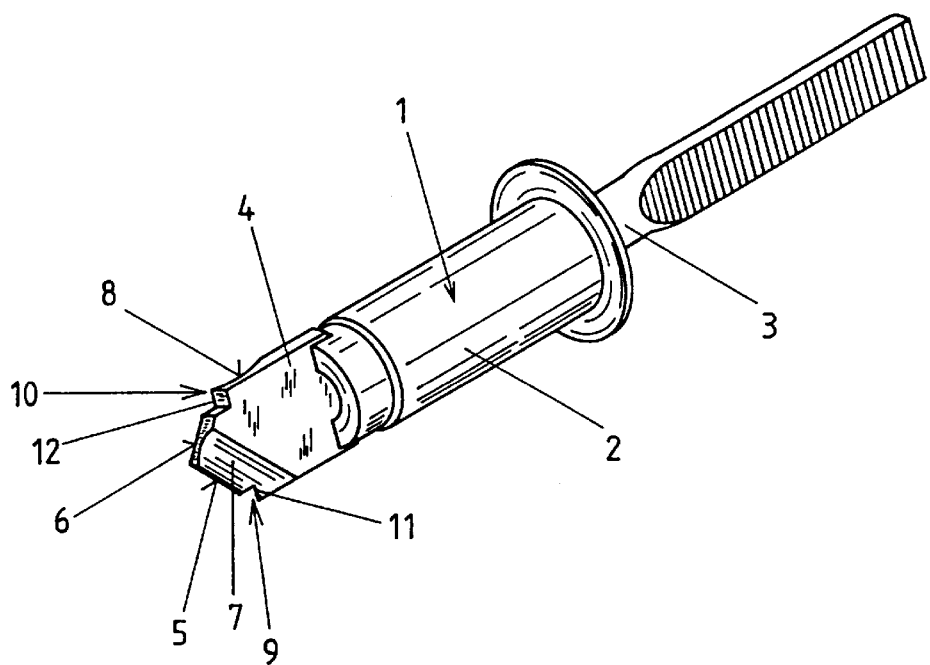

United States Patent

Palm

[11] Patent Number: 6,120,225
[45] Date of Patent: Sep. 19, 2000

[54] LAMINA-SHAPED BOREPIECE FOR SELF-BORING FASTENING ELEMENTS

[75] Inventor: Erich Palm, Heerbrugg, Switzerland

[73] Assignee: SFS Industrie Holding AG, Heerbrugg, Switzerland

[21] Appl. No.: 08/704,589

[22] PCT Filed: Feb. 13, 1995

[86] PCT No.: PCT/EP95/00514

§ 371 Date: Sep. 6, 1996

§ 102(e) Date: Sep. 6, 1996

[87] PCT Pub. No.: WO95/24566

PCT Pub. Date: Sep. 14, 1995

[30] Foreign Application Priority Data

Mar. 9, 1994 [CH] Switzerland ............... 690/94

[51] Int. Cl.[7] .............. P16B 25/00; B23B 51/00
[52] U.S. Cl. .......... 411/29; 411/387.2; 411/387.8; 408/244; 408/225
[58] Field of Search ............. 411/29, 30, 31, 411/387; 408/209, 210, 211, 212, 213, 223, 224, 225, 226, 227, 228, 231

[56] References Cited

U.S. PATENT DOCUMENTS

| | | |
|---|---|---|
| 3,578,762 | 5/1971 | Siebol .................................. 411/387 |
| 3,997,279 | 12/1976 | Porter . |
| 4,028,987 | 6/1977 | Wilson .................................. 411/387 |
| 4,480,951 | 11/1984 | Rogensburger . |
| 5,046,905 | 9/1991 | Piacenti et al. ..................... 411/387 |
| 5,120,172 | 6/1992 | Wakai . |
| 5,452,970 | 9/1995 | Sundstrom et al. ................. 408/227 |
| 5,697,738 | 12/1997 | Stone et al. ......................... 408/225 |
| 5,700,113 | 12/1997 | Stone et al. ...................... 408/225 X |

FOREIGN PATENT DOCUMENTS

| | | |
|---|---|---|
| 0 509 173 | 10/1992 | European Pat. Off. . |
| 2420191 | 11/1975 | Germany . |
| 2801962 | 7/1978 | Germany . |
| 990045025 | 4/1990 | Germany . |
| 90057120 | 5/1990 | Germany . |
| 4003375 | 5/1991 | Germany . |
| 117507 | 5/1991 | Japan ................................. 408/211 |
| 454797 | 5/1988 | Sweden . |

*Primary Examiner*—Brian K. Green
*Assistant Examiner*—Robert G. Santos
*Attorney, Agent, or Firm*—Helfgott & Karas, PC

[57] ABSTRACT

A lamina-shaped borepiece (4) for a self-boring fastening element (1) is provided at its front side with cutting edges (5,6) flanked by grooves (7,8) that extend approximately parallel thereto. Indents (9,10) with set-back cutting edges (11,12) are provided in the area of both front cutting edges (5,6), so that a kind of stepped borer is created. The indents (9,10) are formed in the area of the axial extension of the grooves (7,8).

7 Claims, 2 Drawing Sheets

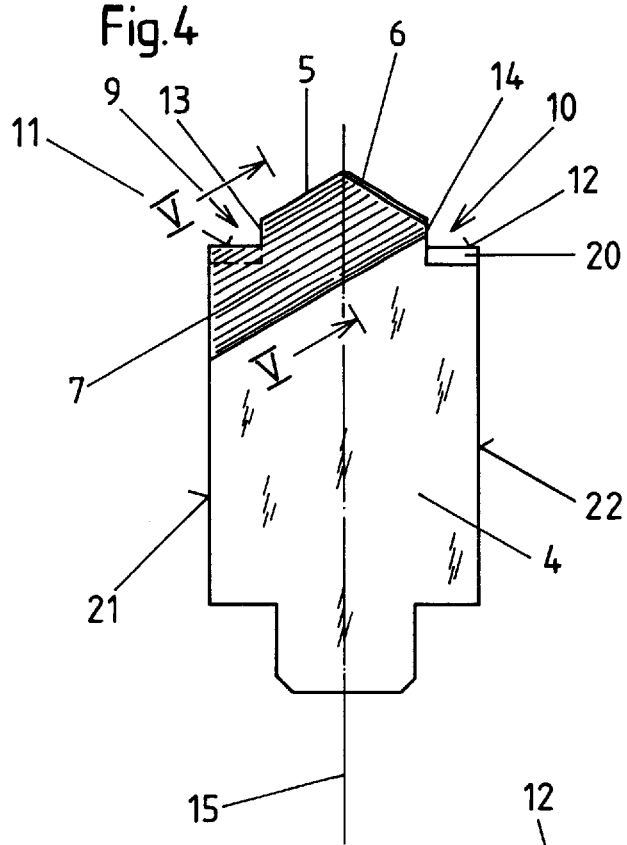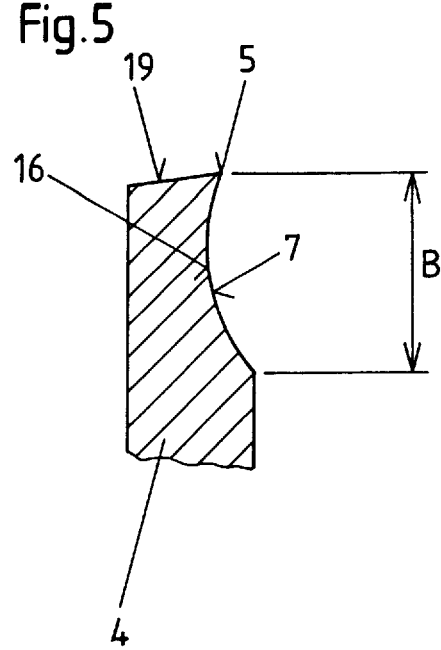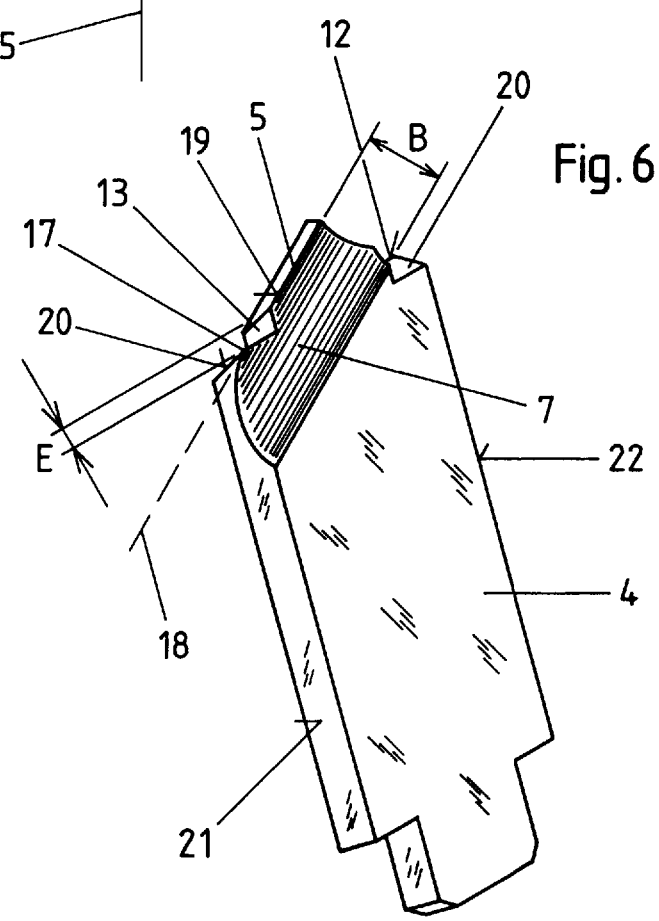

LAMINA-SHAPED BOREPIECE FOR SELF-BORING FASTENING ELEMENTS

The invention relates to a lamina-shaped borepiece for self-boring fastening elements, e.g. rivets, screws, dowels or similar elements, with two front cutting edges which together enclose an angle of less than 180°, and with grooves which are assigned to each of the cutting edges and run at least approximately parallel to them when viewed in the drilling direction.

Specifically in the case of a drilling process in thin material, for example in thin sheet metal, there is always the risk that the bore will not be exactly circular, but rather approximately triangular, like a constant diameter cam. Such a phenomenon occurs both with cylindrical borepieces and with lamina-shaped bore pieces.

A self-boring screw with a lamina-shaped borepiece is known from DE-C 28 01 962. Also, a version has already become known (U.S. Pat. No. 4,480,951), in which a lamina-shaped borepiece is formed like a stepped borer. The front bore section with a small diameter is flanked by a borepiece arranged with an axial offset relative to the first, which can then enlarge the bore which was first produced. Particularly in the case of such lamina-shaped borepieces, however, and at relatively small diameters, there is the problem that because of the thickness of the borepiece, high friction forces occur at the bore wall which is produced.

The present invention has set itself the task of developing a lamina-shaped borepiece in such a way that predrilling can take place with a relatively small diameter, and the production of a precisely circular bore is guaranteed.

According to the invention, this is possible in that an indent with a set-back cutting edge is provided, in each instance, in the region of both front cutting edges, with a first delimitation of these indents being aligned parallel to the center axis of the borepiece, in each instance, and a second delimitation, which forms the set-back cutting edge, running at an acute angle to the center axis, and that the indents are formed in the region of the axial extension of the grooves. With this particular design according to the invention, the result achieved is that the region of the borepiece which directly flanks the two front cutting edges, with the exception of the direct cutting edge region, is thinner than the thickness of the lamina-shaped borepiece, since, after all, this region lies directly in the grooves which cross one another from both sides on the opposite delimitation surfaces.

It is also of particular advantage in the design according to the invention that the set-back cutting edges are also formed in the region of the grooves, so that a corresponding cutting angle can be guaranteed and furthermore there is the possibility of changing the cutting angle, depending on the drilling radius, by varying the angle of these set-back cutting edges.

Such a possibility exists, for example, if the angle enclosed by the set-back cutting edges is greater than the angle enclosed by the front cutting edges. The set-back cutting edges then do not run parallel to the front cutting edges and therefore to the grooves, so that the cutting edges have a different cutting angle over their entire length, and then, at their extreme end, return to the cutting angle determined by the front cutting edges, for example.

It has proven to be advantageous if the angle enclosed by the set-back cutting edges lies in the range between 160° and 180°. As a result, the borepiece set back relative to the center preborepiece can almost act like a milling device, guaranteeing that the larger bore region is already fully in use before the preborepiece formed by the front cutting edges has penetrated the work piece. In addition, this guarantees that proper guidance of the preborepiece exists until the larger bore segment is in full use.

To produce a precisely circular bore hole, it has proven to be sufficient if only a relatively short region functions as the preborepiece. It is therefore proposed that the greatest axial extension of the indents leads approximately to half the width of the grooves.

Furthermore, it is advantageous if the greatest axial extension of the indents leads to the deepest penetration of the groove into the borepiece. This guarantees that a negative cutting angle, viewed from the groove, does not exist at any point of the set-back cutting edges. Of course the front end surface is aligned at an acute angle to the plane of the lamina-shaped borepiece, flanking the set-back cutting edges, but it is nevertheless advantageous if the region of the grooves which flanks the setback cutting edges lies at least in the plane of the lamina-shaped borepiece or forms a corresponding cutting angle, in addition. This significantly improves the removal of chips and, of course, the cutting speed.

Particularly with such a design, it is also particularly advantageous that the cutting angle constantly changes over the length of the set-back cutting edges. From a relatively large angle at the end region of the set-back cutting edges facing the center axis, there is a slow transition to a relatively small angle towards the free outer end of the set-back cutting edges. The larger the diameter region, the smaller the cutting angle becomes, so that the removability of the material is improved particularly in the region where more material must be removed for a larger diameter.

In this connection, it is advantageous if the outermost region, in particular, again receives the cutting angle which also exists in the region of the front cutting edges. This is possible if the end of the setback cutting edges which projects freely and radially lies in a line with the front cutting edges. After all, since the grooves run parallel to the front cutting edges, this results in the same cutting angle in the region of the end of the set-back cutting edges which projects freely and radially.

Using particular measures, it has become possible to produce precisely circular bores, using a lamina-shaped borepiece, even in thin work pieces, in other words even when combining two thin sheets of metal, and this has a positive effect also for subsequent fastening. Rivets, screws, dowels or similar elements can be used with significantly greater effect, i.e. they can only be inserted into the bore with any practical effect if this bore has been produced to be precisely circular.

Such a structure of a lamina-shaped borepiece is not only suitable for drilling through thin work pieces, however, but can be used in the same manner for correspondingly thicker work pieces, since the drilling performance can be significantly increased there with this stepped design.

Figure 2:
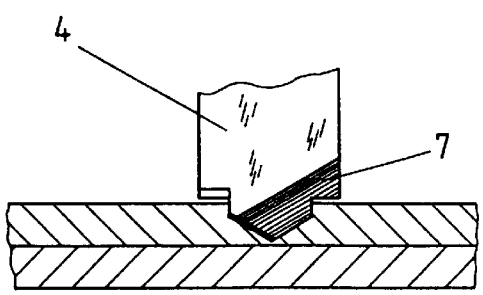
Figure 3:
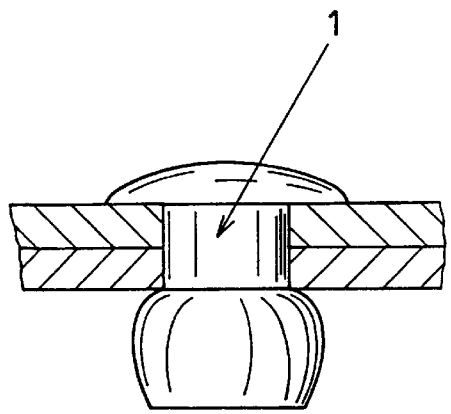

Further characteristics of the invention and particular advantages will be explained in greater detail in the following description, using the drawings. These show:

FIG. 1 a lamina-shaped borepiece being used with a self-boring blind rivet;

FIG. 2 the start of drilling by a borepiece in a thin work piece;

FIG. 3 a cross-section through the work piece with the blind rivet completely set in place;

FIG. 4 a borepiece in a view from the front;

FIG. 5 a cross-section along the line V—V in FIG. 4;

FIG. 6 a slanted view of a lamina-shaped borepiece.

FIG. 1 shows a self-boring fastening element in the form of a blind rivet 1, which is formed from a rivet sleeve 2, a pulling mandrel 3 and a lamina-shaped borepiece 4. The lamina-shaped borepiece has two cutting edges 5 and 6, which form the front end of the borepiece 4 viewed in the drilling direction. At least approximately parallel to these cutting edges 5, 6 there are grooves 7, 8 provided on both sides on the surface of the borepiece 4. In the region of the two front cutting edges 5 and 6, indents 9, 10 are provided in each instance, which form set-back cutting edges 11, 12. A first delimitation 13, 14 of these indents 9, 10 is aligned at least approximately parallel to the center axis 15 of the borepiece 4. The second delimitation, which forms the set-back cutting edge 11, 12, runs at an acute angle to the center axis 15. An essential characteristic in this connection is that the indents 9, 10 are formed in the region of the axial extension of the grooves 7, 8. It is practical if the angle enclosed by the set-back cutting edges 11, 12 lies in the range between 160° and 180°; it is therefore significantly greater than the angle enclosed by the two front cutting edges 5 and 6. It is advantageous if the angle enclosed by the two set-back cutting edges 11, 12 is slightly smaller than 180°, so that the risk of cutting a ring-shaped disk out of the material to be drilled through at the end of the drilling process is precluded. This also reduces the risk that the borepiece might seize or lock at the end of the drilling process, so that a disruption of the drilling process is precluded.

From all the representations of the drawing, it is evident that the greatest axial extension E of the indents 9, 10 leads to a maximum of half the width B of the grooves 7, 8. Particular attention is paid to the fact that the greatest axial extension E of the indents 9, 10 leads to the deepest penetration of the groove 7, 8 into the borepiece 4. In other words, this is the case at the transition 16 for the grooves 7, 8 which run in arc shape in cross-section. Then, as clearly is evident from FIG. 6, because of the shading lines which are drawn in, there is the advantage that different cutting angles exist over the entire length of the set-back cutting edges 11, 12. In other words, the cutting angle becomes smaller, the farther the cutting edges 11, 12 lead to the outside. This results simply from the predetermined grooves 7, 8 and from the arrangement of the indents, as proposed by the invention, and therefore of the set-back cutting edges 11, 12.

In a particular design, the end 17 of the set-back cutting edges 11, 12 which projects freely and radially lies in a line 18 with the front cutting edges 5 and 6, respectively.

Dropping surfaces 19 and 20, respectively, flank the front cutting edges 5 and 6 as well as the set-back cutting edges 11, 12, at an acute angle to the plane of the borepiece 4; these also have an influence on the cutting angle. In this connection, it is additionally advantageous, particularly if deeper bores are to be produced, if the lateral delimitation surfaces 21 and 22 of the lamina-shaped borepiece also are inclined at an acute angle, facing away from the drilling direction, in order to thereby prevent friction problems at the bore wall.

The lamina-shaped borepiece can be produced as a separate work piece and connected with the fastening element using a positive or non-positive lock. It is then possible to make the borepiece and the fastening element itself, or just parts of this fastening element, from a different material or a different material combination. Then it is also possible, in practical manner, to produce the lamina-shaped borepieces using a punching process. However, it would also be possible, in principle, to form borepieces which are formed in one piece on the fastening element, which are formed in lamina shape in terms of their shape, in the manner according to the invention, so that the same advantages can be achieved also with such fastening elements. Such a variant is possible if the fastening element consists of a material which can be hardened, or if it at least has a partial segment made of material which can be hardened.

In the description, it has constantly been assumed that the lamina-shaped borepiece according to the present invention is intended for use for self-boring fastening elements. However, it would certainly be possible to use such a lamina-shaped borepiece as the insertion part or end part of a borer itself, without this borer also being a fastening element.

What is claimed is:

1. Lamina-shaped borepiece for self-boring fastening elements, the borepiece including a first frontmost cutting edge and a second frontmost cutting edge which together enclose an angle of less than 180°, and with a groove on each opposing side of said lamina borepiece, each of said grooves running adjacent and parallel to a respective one of said first and said second frontmost cutting edges when viewed in the drilling direction, wherein a front edge of each groove is defined by a respective frontmost cutting edge and a rear edge of each groove is defined by a single linear edge parallel and spaced apart from said respective frontmost cutting edge, wherein a first indent and a second indent each with a set-back cutting edge is provided, in each instance, in the region of both frontmost cutting edges with a first delimitation of these indents being defined by a surface aligned parallel to the longitudinal center axis of the borepiece, in each instance, and a second delimitation, having a surface with an edge which forms the set-back cutting edge and perpendicular to the longitudinal center axis, and that the indents are formed within the region of the axial extension of the grooves.

2. Borepiece according to claim 1, characterized in that the angle enclosed by the set-back cutting edges (11, 12) is greater than the angle enclosed by the front cutting edges (5, 6).

3. Borepiece according to claim 1, characterized in that the angle enclosed by the set-back cutting edges (11, 12) lies in the range between 160° and 180°.

4. Borepiece according to claim 1, characterized in that the greatest axial extension (E) of the indents (9, 10) leads approximately to half the width (B) of the grooves (7, 8).

5. Borepiece according to claim 1, characterized in that the greatest axial extension (E) of the indents (9, 10) leads to the deepest penetration of the groove (7, 8) into the borepiece (4).

6. Borepiece according to claim 1, characterized in that the end (17) of the set-back cutting edges (11, 12) which projects freely and radially lies in a line (18) with the front cutting edges (5, 6).

7. Lamina-shaped borepiece for self-boring fastening elements, the borepiece including two front cutting edges which together enclose an angle of less than 180°, and grooves assigned to each of the cutting edges and at least approximately parallel to the cutting edges when viewed in the drilling direction, wherein a front edge of each groove is defined by a respective front cutting edge and a rear edge of each groove is defined by a single linear edge parallel and spaced apart from said respective front cutting edge, wherein an indent with a set-back cutting edge is provided, in each instance, in the region of both front cutting edges, with a first delimitation of these indents being defined by a surface aligned parallel to the longitudinal center axis of the borepiece, in each instance, and a second delimitation, having a surface with an edge which forms the set-back cutting edge and is therefore at an acute angle to a plane of the borepiece, and that the indents are formed within the region of the axial extension of the grooves.

* * * * *